(12) United States Patent
Mirhosseini et al.

(10) Patent No.: US 12,488,414 B1
(45) Date of Patent: Dec. 2, 2025

(54) GENERATING DIFFERENT VERSIONS OF VISUAL CONTENT FOR DISPLAY

(71) Applicant: Apple Inc., Cupertino, CA (US)

(72) Inventors: Seyedkoosha Mirhosseini, Santa Clara, CA (US); Andrew B. Watson, Los Gatos, CA (US); Thomas Post, San Mateo, CA (US); Yashas Rai Kurlethimar, San Jose, CA (US)

(73) Assignee: APPLE INC., Cupertino, CA (US)

( * ) Notice: Subject to any disclaimer, the term of this patent is extended or adjusted under 35 U.S.C. 154(b) by 234 days.

(21) Appl. No.: 18/232,600

(22) Filed: Aug. 10, 2023

Related U.S. Application Data

(60) Provisional application No. 63/397,231, filed on Aug. 11, 2022.

(51) Int. Cl.
  *G06T 3/40* (2024.01)
  *G06F 3/14* (2006.01)
(52) U.S. Cl.
  CPC . *G06T 3/40* (2013.01); *G06F 3/14* (2013.01)
(58) Field of Classification Search
  CPC .................................. G06T 3/40; G06F 3/14
  USPC .......................................................... 382/298
  See application file for complete search history.

(56) References Cited

U.S. PATENT DOCUMENTS

| | | | |
|---|---|---|---|
| 9,142,052 B1* | 9/2015 | Caine | G06T 3/40 |
| 9,615,077 B2* | 4/2017 | Song | H04N 13/144 |
| 11,797,103 B1* | 10/2023 | Douglas | G06F 3/014 |
| 2010/0103077 A1* | 4/2010 | Sugiyama | G02B 27/0172 |
| | | | 340/425.5 |
| 2019/0259201 A1* | 8/2019 | Duca | G06T 15/20 |

\* cited by examiner

*Primary Examiner* — Gabriel I Garcia
(74) *Attorney, Agent, or Firm* — Fernando & Partners, LLP

(57) ABSTRACT

A vertical lookup table (LUT) stores first vertical scale values for a first display in a first portion and second vertical scale values for a second display in a second portion. A horizontal LUT stores horizontal scale values for the first display and the second display. A first version of visual content is generated for the first display by applying the first vertical scale values and the horizontal scale values to a first image frame that represents the visual content at a first resolution. A second version of the visual content is generated for the second display by applying the second vertical scale values and the horizontal scale values to a second image frame that represents the visual content at a second resolution.

20 Claims, 10 Drawing Sheets

GENERATING DIFFERENT VERSIONS OF VISUAL CONTENT FOR DISPLAY

CROSS-REFERENCE TO RELATED APPLICATION

This application claims the benefit of U.S. Provisional Patent App. No. 63/397,231, filed on Aug. 11, 2022, which is incorporated by reference in its entirety.

TECHNICAL FIELD

The present disclosure generally relates to generating different versions of visual content for display.

BACKGROUND

Some devices include a display for displaying visual content. Displaying visual content can be a resource-intensive operation that requires a certain amount of memory and results in power consumption. Portable devices have limited hardware resources that limit their ability to display visual content. For example, a portable device may not have sufficient memory or enough battery power to display visual content at a high resolution at all times.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
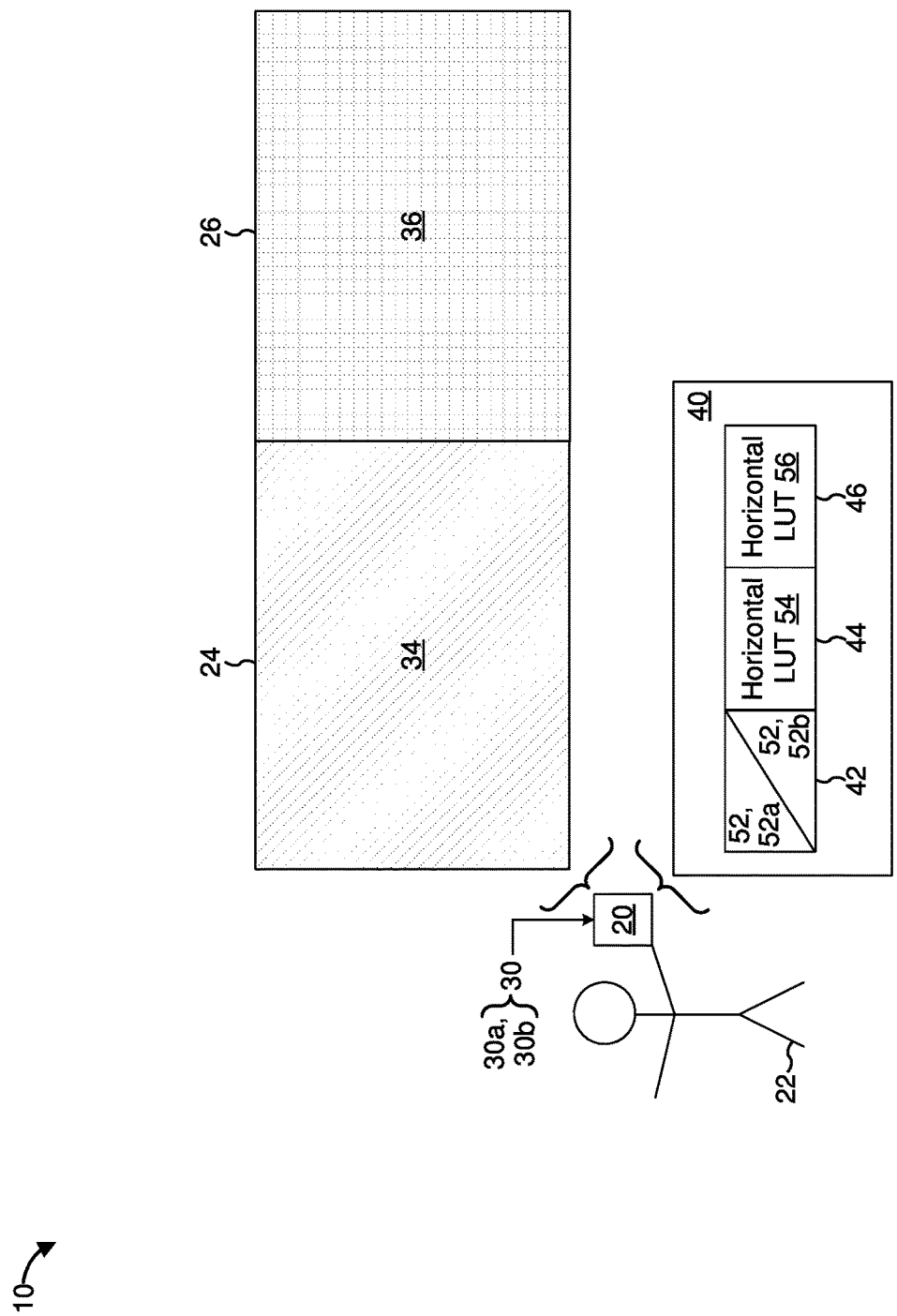
FIG. 1A is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating different versions of an image frame for display. In some implementations, a device includes one or more processors, a non-transitory memory, a first display for a first eye and a second display for a second eye. In various implementations, a method includes storing a vertical lookup table in the non-transitory memory. In some implementations, a first portion of the vertical lookup table stores first vertical scale values for the first display and a second portion of the vertical lookup table stores second vertical scale values for the second display. In some implementations, the method includes storing, in the non-transitory memory, a set of one or more horizontal lookup tables that stores horizontal scale values for the first display and the second display. In some implementations, the method includes generating, for the first display, a first version of visual content by applying the first vertical scale values stored in the first portion of the vertical lookup table and the horizontal scale values stored in the set of one or more horizontal lookup tables to a first image frame that represents the visual content at a first resolution. In some implementations, the method includes generating, for the second display, a second version of the visual content by applying the second vertical scale values stored in the second portion of the vertical lookup table and the horizontal scale values stored in the set of one or more horizontal lookup tables to a second image frame that represents the visual content at a second resolution that is different from the first resolution.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Rendering high resolution stereo images for XR applications can be computationally intensive. Generating high resolution images for a first eye display while generating lower resolution images for a second eye display can reduce the computational load. Generating images sometimes includes applying scale values that are stored in lookup tables (LUTs). LUT sizes are generally a function of image resolution. When each display is displaying images at different resolutions, the device generally utilizes LUTs of different sizes that match the resolutions. However, storing scale values for both displays in different LUTs may not be feasible due to memory constraints. For example, storing the scale values may require two vertical LUTs and two horizontal LUTs but the hardware may only include three registers for storing two horizontal LUTs and a single vertical LUT.

The present disclosure provides methods, systems, and/or devices for generating different versions of visual content for respective displays using a single vertical LUT that stores scale values for two different eye displays in order to satisfy a memory constraint in hardware. A device stores a vertical LUT in a single register and uses scale values from the vertical LUT to generate image frames of different resolutions for respective eye displays. The scale values define how corresponding sections of an input image scale to an output image. Using a single register to store the vertical LUT for two displays allows the device to generate image frames at different resolutions for the two displays.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In the example of FIG. 1A, the physical environment 10 includes an electronic device 20 and a user 22 of the electronic device 20.

In some implementations, the electronic device 20 includes a handheld computing device that can be held by the user 22. For example, in some implementations, the electronic device 20 includes a smartphone, a tablet, a media player, a laptop, or the like. In some implementations, the electronic device 20 includes a wearable computing device that can be worn by the user 22. For example, in some implementations, the electronic device 20 includes a head-mountable device (HMD) or an electronic watch.

In some implementations, the electronic device 20 includes a first display 24 for a first eye of the user 22 (e.g., for a left eye of the user 22) and a second display 26 for a second eye of the user 22 (e.g., for a right eye of the user 22). In various implementations, the electronic device 20 obtains visual content 30 that is to be displayed on the first display 24 and the second display 26. In order to conserve resources, the electronic device 20 generates and displays different versions of the visual content 30 on the first display 24 and the second display 26. For example, the electronic device 20 generates a first version 34 of the visual content 30 for the first display 24, and a second version 36 of the visual content 30 for the second display 26 that utilizes fewer resources (e.g., less power, less memory and/or requires a shorter rendering time) to generate and/or display.

In some implementations, the electronic device 20 receives the visual content 30 from another device. For example, the electronic device 20 may include an HMD that receives the visual content 30 from a smartphone or a tablet. In some implementations, the electronic device 20 receives the visual content 30 from a network element. In some implementations, the electronic device 20 receives the visual content 30 from a content distribution platform that stores and provides various media content items such as movies and TV shows. In some implementations, the electronic device 20 generates the visual content 30. In some implementations, the electronic device 20 includes an application that generates the visual content 30. For example, the visual content 30 may represent a game and a gaming application that at least partially resides on the electronic device 20 may generate the visual content 30.

In some implementations, the first version 34 of the visual content 30 is at a first resolution and the second version 36 of the visual content 30 is at a second resolution that utilizes fewer resources to generate and/or display. In some implementations, the first version 34 of the visual content 30 is a colored version and the second version 36 of the visual content 30 is a black-and-white version (e.g., a grayscale version) that utilizes fewer resources to generate and/or display.

In some implementations, the electronic device 20 includes a set of registers 40. In the example of FIG. 1A, the set of registers 40 includes three registers: a first register 42, a second register 44 and a third register 46. The first register 42 stores a vertical lookup table (LUT) 52 that stores vertical scale values that correspond to a vertical dimension of the first display 24 and the second display 26. The vertical LUT 52 includes a first portion 52a that stores first vertical scale values for the first display 24 and a second portion 52b that stores second vertical scale values for the second display 26. The second register 44 stores a first horizontal LUT 54 that stores first horizontal scale values that correspond to a horizontal dimension of the first display 24. The third register 46 stores a second horizontal LUT 56 that stores second horizontal scale values that correspond to the horizontal dimension of the second display 26.

In various implementations, the visual content 30 can be represented by different video streams or image frames at respective resolutions. For example, the visual content 30 may be represented by a first image frame 30a at a first resolution (e.g., 4K resolution, for example, 3840×2160) and by a second image frame 30b at a second resolution that is different from the first resolution (e.g., 720p resolution, for example, 1280×720). In some implementations, the electronic device 20 receives the first image frame 30a and the second image frame 30b. Alternatively, in some implementations, the electronic device 20 receives the first image frame 30a, and the electronic device 20 generates the second image frame 30b based on the first image frame 30a (e.g., by downsampling the first image frame 30a, for example, by reducing a resolution of the first image frame 30a). In various implementations, the electronic device 20 generates the first version 34 of the visual content 30 by applying the first vertical scale values stored in the first portion 52a of the vertical LUT 52 and the first horizontal scale values stored in the first horizontal LUT 54 to the first image frame 30a that represents the visual content 30 at the first resolution. For example, the electronic device 20 generates the first version 34 of the visual content 30 by scaling (e.g., expanding or contracting) sections of the first image frame 30a in a vertical dimension in accordance with the first vertical scale values stored in the first portion 52a of the vertical LUT 52 and by scaling (e.g., expanding or contracting) sections of the first image frame 30a in a horizontal dimension in accordance with the first horizontal scale values stored in the first horizontal LUT 54. In various implementations, the electronic device 20 generates the second version 36 of the visual content 30 by applying the second vertical scale values stored in the second portion 52b of the vertical LUT 52 and the second horizontal scale values stored in the second horizontal LUT 56 to the second image frame 30b. For example, the electronic device 20 generates the second version 36 of the visual content 30 by scaling (e.g., expanding or contracting) sections of the second image frame 30b in the vertical dimension in accordance with the second vertical scale values stored in the second portion 52b of the vertical LUT 52 and by scaling (e.g., expanding or contracting) sections of the second image frame 30b in the horizontal dimension in accordance with the second horizontal scale values stored in the second horizontal LUT 56.

Figure 1C:
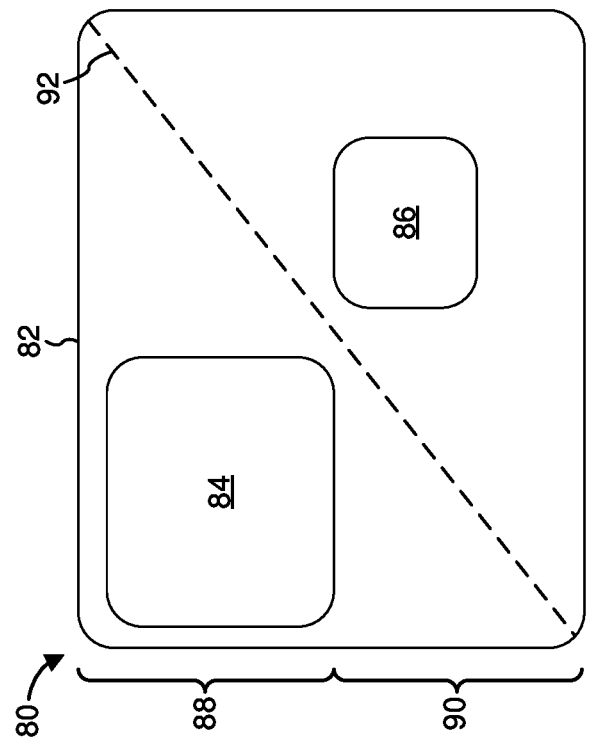
FIGS. 1B-1F are diagrams of example storage structures in accordance with some implementations.
Figure 1B:
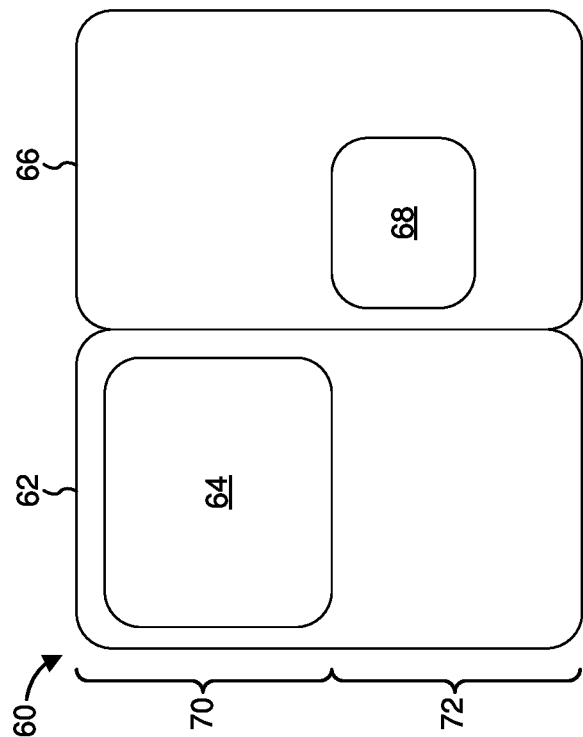

Referring to FIG. 1B, in some implementations, the vertical LUT 52 (shown in FIG. 1A) is implemented as an array 60 of two sets of vertical scale values for the first display 24 and the second display 26, respectively. The array 60 includes a first index position 62 that stores a first set of vertical scale values 64 for the first display 24 and a second index position 66 that stores a second set of vertical scale values 68 for the second display 26. As illustrated in FIG. 1B, the first set of vertical scale values 64 is stored in a top half 70 of the first index position 62 within the array 60 and the second set of vertical scale values 68 is stored in a bottom half 72 of the second index position 66 within the array 60. The bottom half 72 corresponding to the first index position 62 is blank (e.g., holds null values) and the top half 70 corresponding to the second index position 66 is blank (e.g., holds null values). The first index position 62 and the second index position 66 have a height that is a sum of the top half 70 and the bottom half 72. Since the first index position 62 and the second index position 66 have a height that is double of a height required to store the vertical scale values 64 and 68, the implementation of the vertical LUT 52 as the array 60 is sometimes referred to as a double tall configuration.

FIG. 1C illustrates a vertical LUT 80 that includes a single set of vertical scale values 82. The single set of vertical scale values 82 includes first vertical scale values 84 for the first display 24 and second vertical scale values 86 for the second display 26. The first vertical scale values 84 for the first display 24 are stored in a top half 88 of the vertical LUT 80 and the second vertical scale values 86 for the second display 26 are stored in a bottom half 90 of the vertical LUT 80. Since the vertical scale values 84 and 86 are on opposite sides of a diagonal line 92, the implementation shown in FIG. 1C is sometimes referred to as a diagonal shared configuration. While the first vertical scale values 84 are stored in the top half 88 and the second vertical scale values 86 are stored in the bottom half 90, in some implementations, the first vertical scale values 84 may be stored in the bottom half 90 and the second vertical scale values 86 may be stored in the top half 88.

Figure 1D:
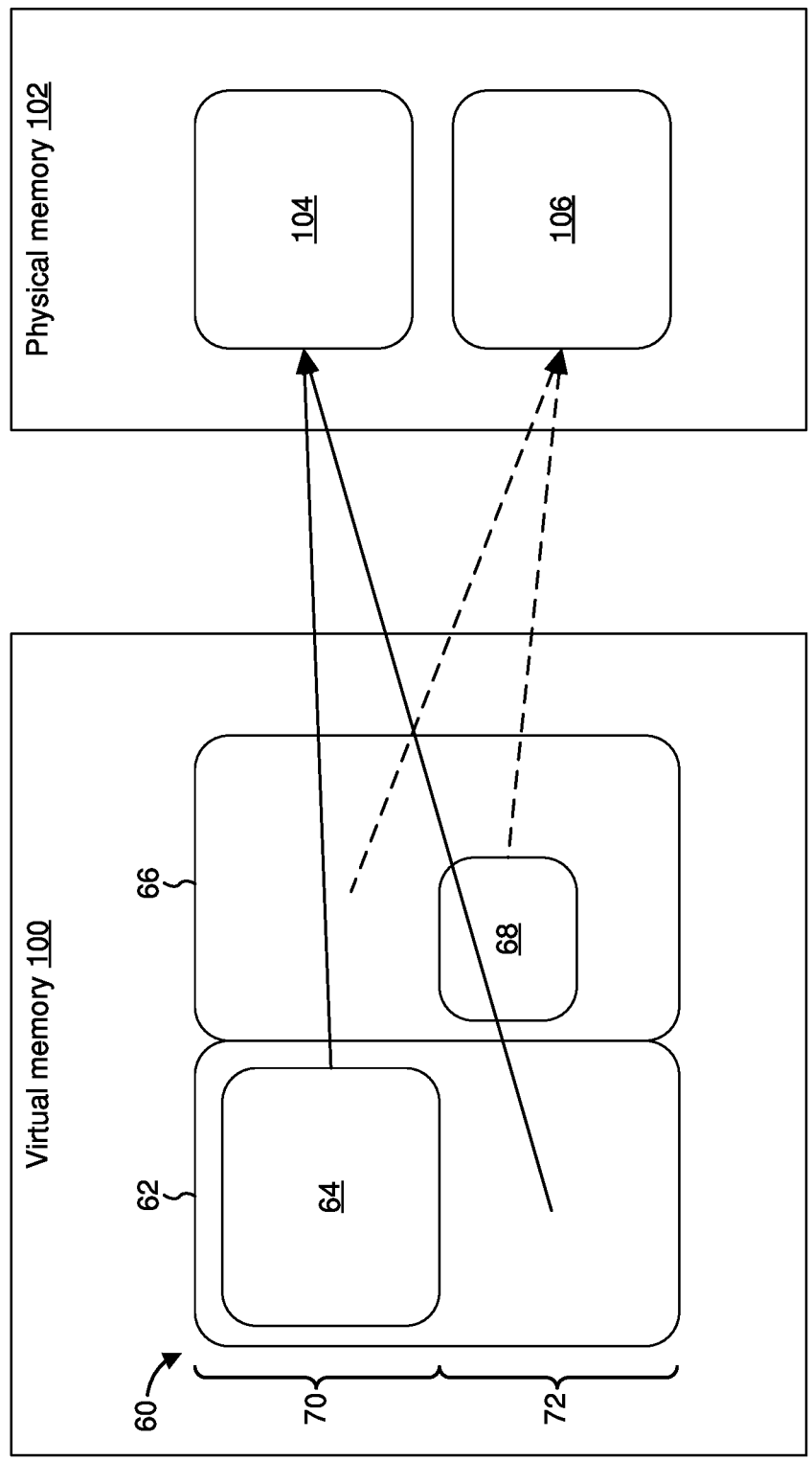

FIG. 1D illustrates an implementation of the double tall configuration (shown in FIG. 1B) that utilizes virtual memory 100 to conserve physical memory 102. As shown in FIG. 1D, the top half 70 and the bottom half 72 of the first index position 62 are mapped to a first physical memory location 104. Mapping the top half 70 and the bottom half 72 of the first index position 62 to the same physical memory location is more efficient than mapping that top half 70 and the bottom half 72 of the first index position 62 to different physical memory locations. Since the bottom half 72 of the first index position 62 is empty, the bottom half 72 of the first index position 62 does not need to be mapped to a different physical memory location than the top half 70 of the first index position 62. Similarly, the top half 70 of the second index position 66 and the bottom half 72 of the second index position 66 are mapped to a second physical memory location 106. Since the top half 70 and the bottom half 72 of the first index position 62 are mapped to the same physical memory location, this implementation of the vertical LUT 52 is sometimes referred to as double mapped configuration.

Figure 1E:
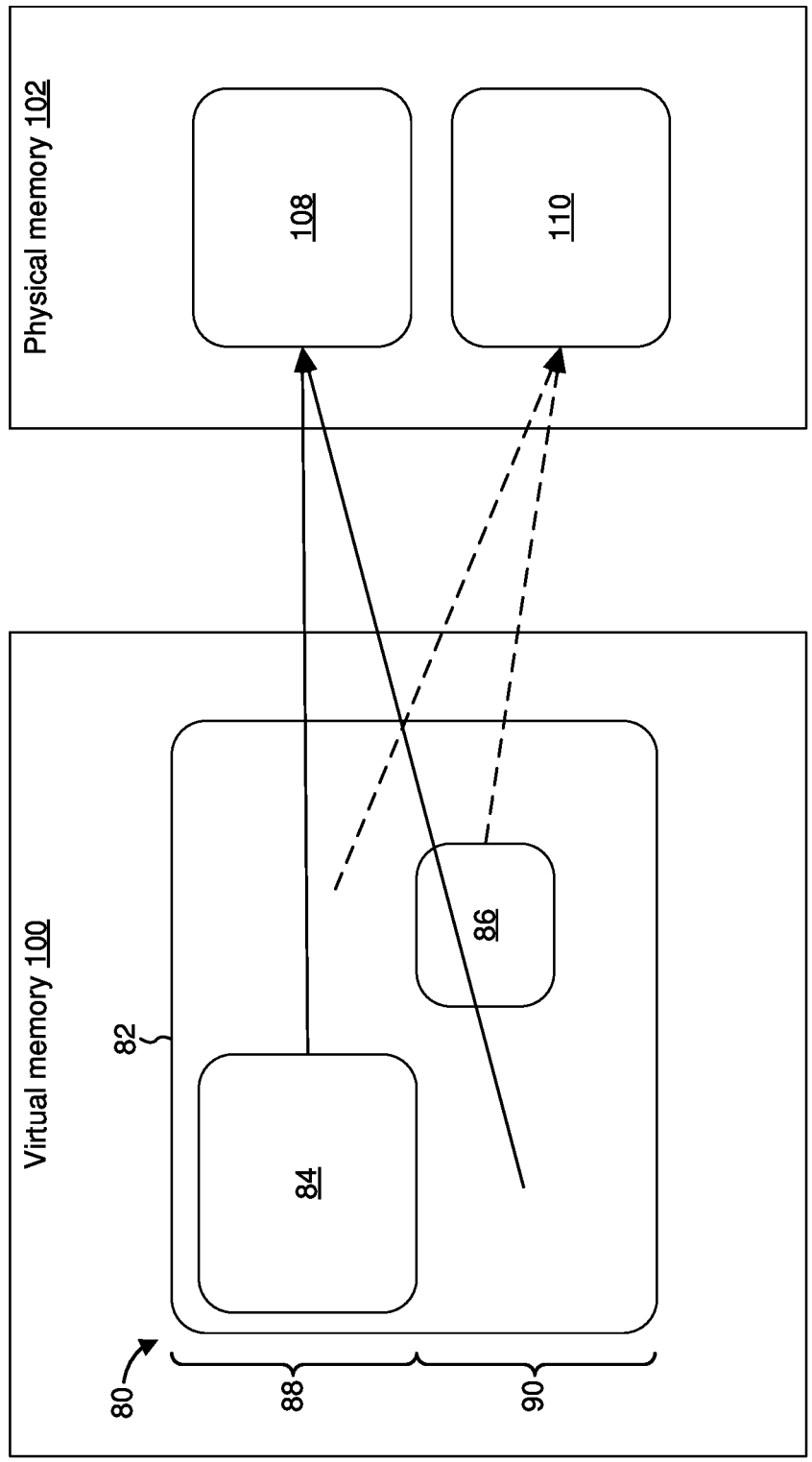

FIG. 1E illustrates a double mapped version of the diagonal shared configuration shown in FIG. 1C. As can be seen in FIG. 1E, a left side of the vertical LUT 80 is mapped to a first physical memory location 108 and a right side of the vertical LUT 80 is mapped to a second physical memory location 110. The top half 88 of the left side of the vertical LUT 80 includes the first vertical scale values 84 for the first display 24 and a bottom half 90 of the left side of the vertical LUT 80 is blank. The top half 88 of the left side of the vertical LUT 80 and the bottom half 90 of the left side of the vertical LUT 80 are mapped to the first physical memory location 108. The bottom half 90 of the right side of the vertical LUT 80 stores the second vertical scale values 86 for the second display 26 and the top half 88 of the right side of the vertical LUT 80 stores null values. The bottom half 90 of the right side of the vertical LUT 80 and the top half 88 of the right side of the vertical LUT 80 are mapped to the second physical memory location 110.

Figure 1F:
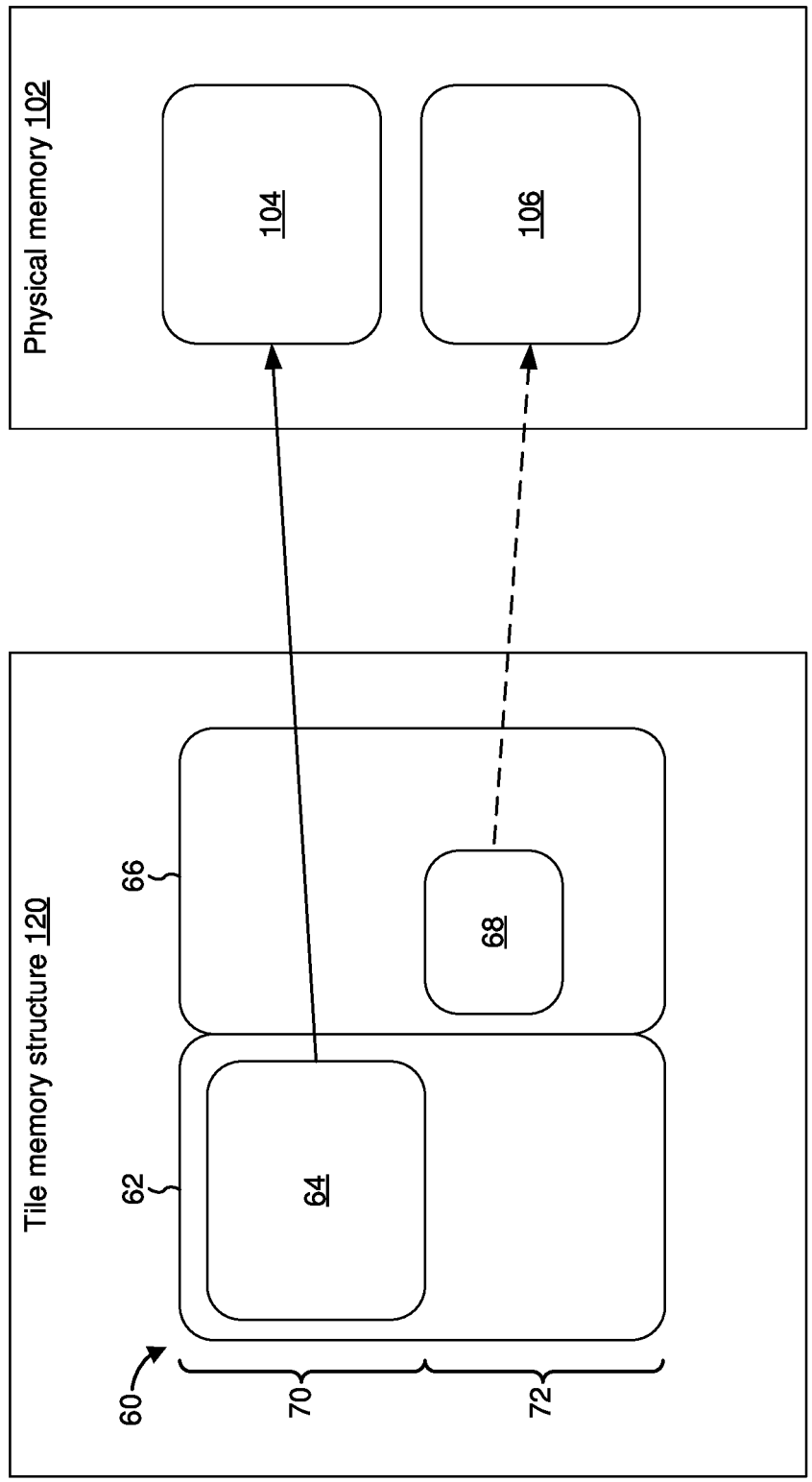

FIG. 1F illustrates the use of a tile memory structure 120. In the example of FIG. 1F, the array 60 is stored in the tile memory structure 120. Since the array 60 is sometimes referred to as a double tall configuration of the vertical LUT 52, storing the array 60 in the tile memory structure 120 is sometimes referred to as a double tall memoryless configuration or a double tall in tile configuration. In the example of FIG. 1F, the first set of vertical scale values 64 and the second set of vertical scale values 68 are written to the physical memory locations 104 and 106, respectively, as discussed in relation to FIG. 1D.

Figure 1G:
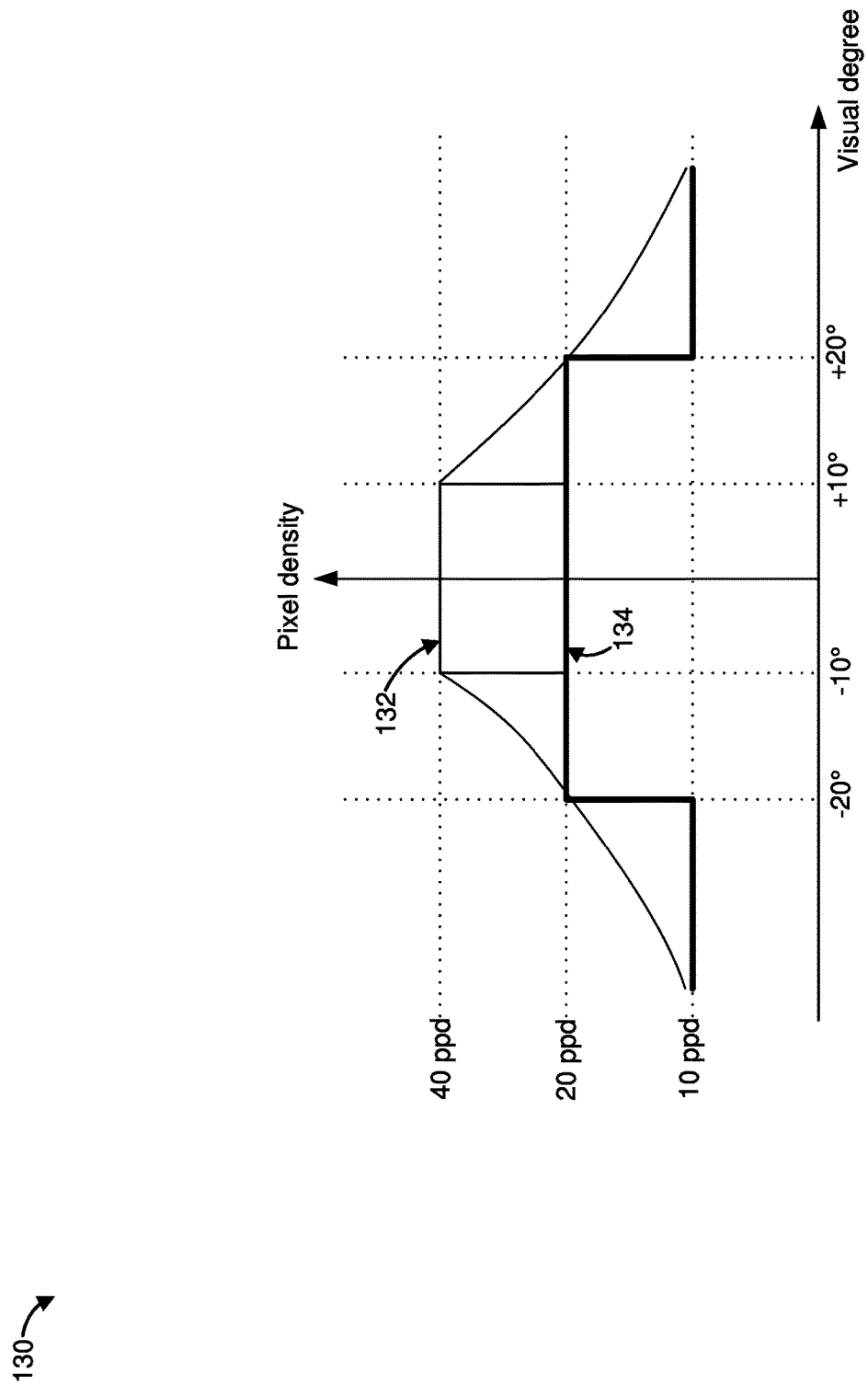
FIG. 1G is a diagram of an example pixel density curve in accordance with some implementations.

FIG. 1G illustrates a pixel density graph 130. The pixel density graph 130 includes a first pixel density curve 132 that indicates pixel density values for the first display 24 and a second pixel density curve 134 (shown in bold) that indicates pixel density values for the second display 26. The unit of measurement for the pixel densities in FIG. 1G is pixels per degree (ppd). The visual degree corresponds to an area that the user 22 may be focusing on. For example, pixels at a visual degree of 0° are in a region where the user 22 is gazing, pixels at a visual degree of +10° or −10° may be at an edge of the region where the user 22 is gazing, and pixels at a visual degree of +20° or −20° may be outside of the region where the user 22 is gazing.

As illustrated in FIG. 1G, the second pixel density curve 134 has a lower maximum value than the first pixel density curve 132. The first pixel density curve 132 may correspond to the first version 34 of the visual content 30 shown in FIG. 1A and the second pixel density curve 134 may correspond to the second version 36 of the visual content 30 shown in FIG. 1A. Since the second pixel density curve 134 has a lower pixel density than the first pixel density curve 132, the second version 36 of the visual content 30 has a lower resolution than the first version 34 of the visual content 30. Referring to FIGS. 1A, 1B, 1D and 1F, the first pixel density curve 132 may correspond to the first version 34 of the visual content 30 that is generated by applying the first set of vertical scale values 64 stored in the first index position 62 to the first image frame 30a, and the second pixel density curve 134 may correspond to the second version 36 of the visual content 30 that is generated by applying the second set of vertical scale values 68 stored in the second index position 66 to the second image frame 30b. Referring to FIGS. 1A, 1C and 1E, the first pixel density curve 132 may correspond to the first version 34 of the visual content 30 that is generated by applying the first vertical scale values 84 to the first image frame 30a, and the second pixel density curve 134 may correspond to the second version 36 of the visual content 30 that is generated by applying the second vertical scale values 86 to the second image frame 30b.

Figure 1H:
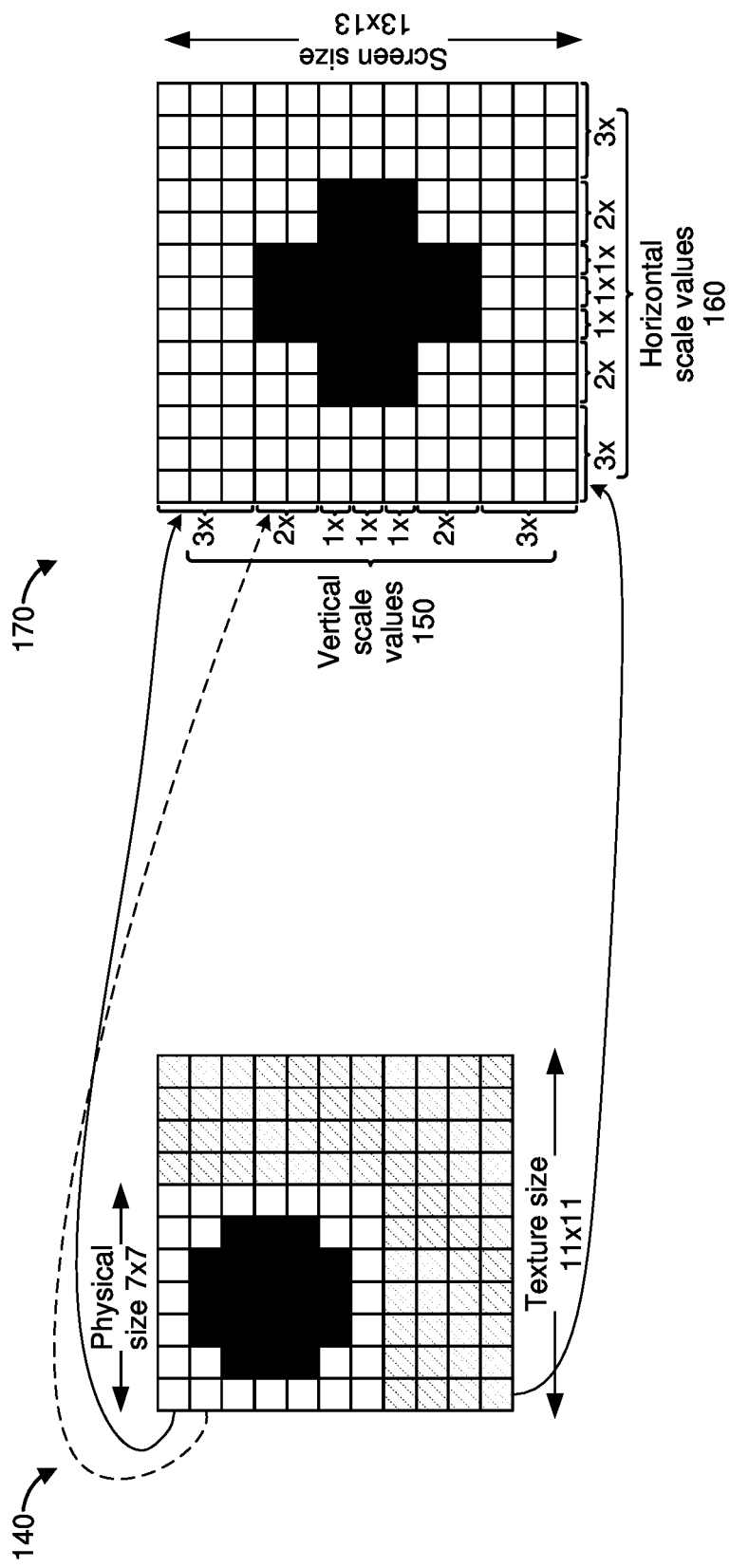
FIG. 1H is a diagram that illustrates an example scaling operation in accordance with some implementations.

FIG. 1H illustrates an example scaling operation. In the example of FIG. 1H, an input image 140 is scaled in accordance with vertical scale values 150 and horizontal scale values 160 in order to generate an output image 170. In some implementations, the input image 140 is generated by a renderer (e.g., the input image 140 may be the rendering result 222 generated by the renderer 220 shown in FIG. 2). In some implementations, the output image 170 is displayed on a display (e.g., the display(s) 240 shown in FIG. 2). The vertical scale values 150 may be stored in a vertical LUT (e.g., the vertical LUT 52 shown in FIG. 1A) and the horizontal scale values 160 may be stored in a horizontal LUT (e.g., the first horizontal LUT 54 or the second horizontal LUT 56 shown in FIG. 1A). The vertical scale values 150 define how corresponding sections of the input image 140 are scaled in a vertical dimension. For example, as shown in FIG. 1H, the first row of the input image 140 is spatially expanded in the vertical dimension by a factor of three because the vertical scale value 150 corresponding to the first row is '3'. As another example, as shown in FIG. 1H, the second row of the input image 140 is spatially expanded in the vertical dimension by a factor of two because the vertical scale value 150 corresponding to the second row is '2'. The next three rows of the input image 140 (e.g., rows 3-5) are not expanded spatially because the vertical scale values 150 corresponding to the next three rows is '1'. Similar to the second row, the sixth row of the input image 140 is spatially expanded in the vertical dimension by a factor of two because the vertical scale value 150 corresponding to the sixth row is '2'. Similar to the first row, the seventh row of the input image 140 is spatially expanded in the vertical dimension by a factor of three because the vertical scale value 150 corresponding to the seventh row is '3'.

The horizontal scale values 160 define how corresponding sections of the input image 140 are scaled in a horizontal dimension. For example, as shown in FIG. 1H, the first column of the input image 140 is spatially expanded in the horizontal dimension by a factor of three because the horizontal scale value 160 corresponding to the first column is '3'. As another example, as shown in FIG. 1H, the second column of the input image 140 is spatially expanded in the horizontal dimension by a factor of two because the horizontal scale value 160 corresponding to the second column is '2'. The next three columns of the input image 140 (e.g., columns 3-5) are not expanded spatially because the horizontal scale values 160 corresponding to the next three columns is '1'. Similar to the second column, the sixth column of the input image 140 is spatially expanded in the horizontal dimension by a factor of two because the horizontal scale value 160 corresponding to the sixth column is '2'. Similar to the first column, the seventh column of the input image 140 is spatially expanded in the horizontal dimension by a factor of three because the horizontal scale value 160 corresponding to the seventh column is '3'. In the example of FIG. 1H, the vertical scale values 150 and the horizontal scale values 160 are the same. However, in some implementations, the vertical scale values 150 and the horizontal scale values 160 may be different. FIG. 1H illustrates the vertical scale values 150 and the horizontal scale values 160 for a single display (e.g., the first display 24 shown in FIG. 1A). In various implementations, the vertical scale values 150 and/or the horizontal scale values 160 are different for different displays.

Figure 2:
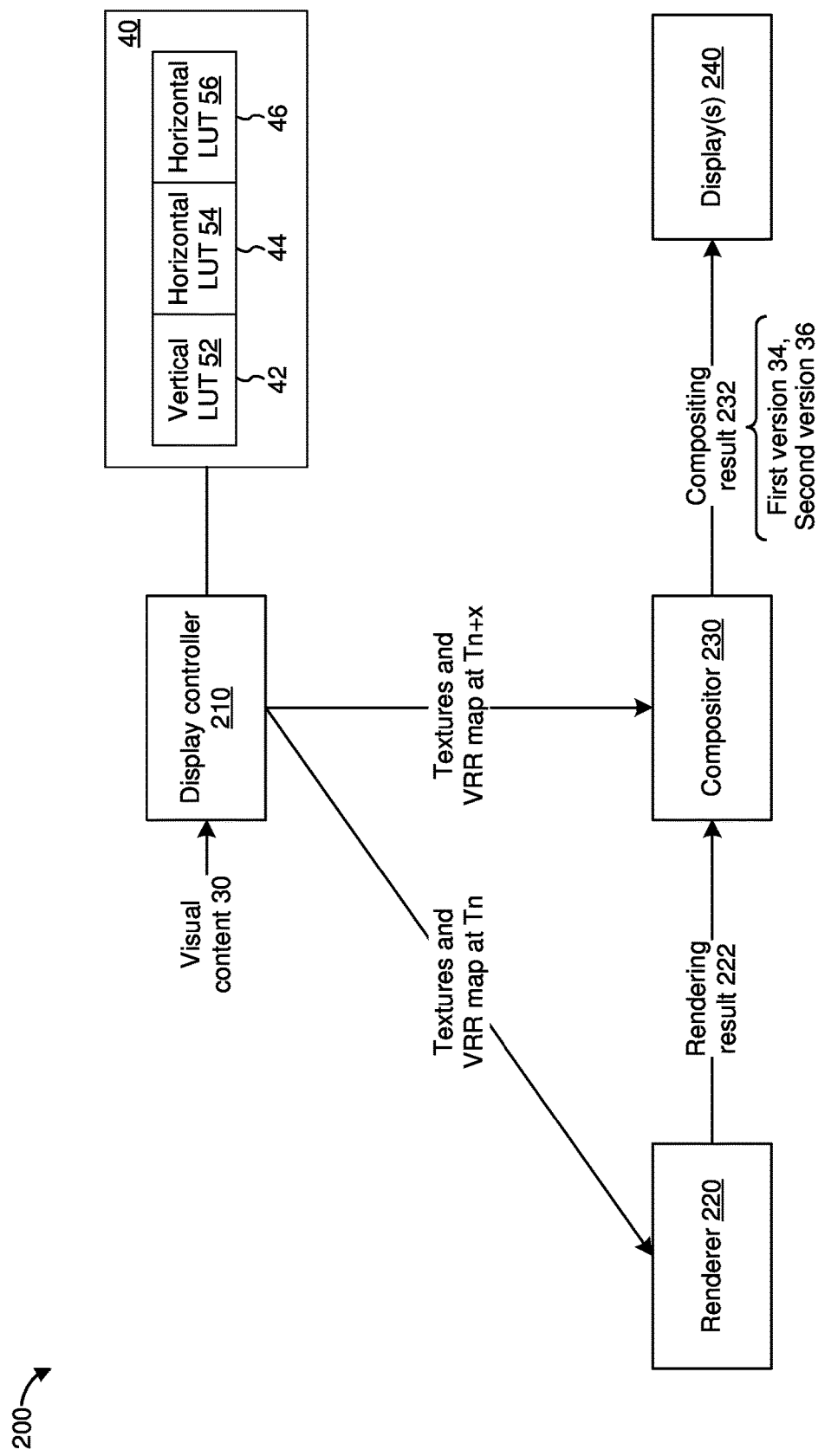
FIG. 2 is a block diagram of a system that generates different versions of visual content in accordance with some implementations.

FIG. 2 is a block diagram of a system 200 that generates different versions of visual content for respective displays. In some implementations, the system 200 includes a display controller 210, a renderer 220, a compositor 230 and a set of displays 240 (e.g., the first display 24 and the second display 26 shown in FIG. 1A). In various implementations, the system 200 resides at (e.g., is implemented by) the electronic device 20 shown in FIG. 1A.

In various implementations, the display controller 210 obtains the visual content 30. In some implementations, the display controller 210 receives the visual content 30 from an image sensor (e.g., a camera) that captured the visual content 30 as an image or a video that includes a set of images. In some implementations, the display controller 210 receives the visual content 30 from an application that generated the visual content 30 (e.g., from a gaming application, a video streaming application, a video chat application, etc.). In some implementations, the display controller 210 receives the visual content 30 from a remote source (e.g., a smartphone, a tablet, or a content distribution platform).

represents video content. (e.g., a video frame that depicts an object such as a stationary furball).

In some implementations, the display controller 210 determines a reduced resolution for one of the displays based on a noticeability threshold. The display controller 210 may reduce the resolution of the visual content 30 to an extent that the reduced resolution is not noticeable to the user. The noticeability threshold may be a function of a content type. For example, the noticeability threshold of textual content (e.g., an ebook, a blog, etc.) may be different from the noticeability threshold of graphical content (e.g., a TV show or a movie). The following table illustrates noticeability thresholds for textual content and graphical content.

|  | 40 ppd | 32 ppd | 28 ppd | 24 ppd | 20 ppd |
| --- | --- | --- | --- | --- | --- |
| Textual content | Resolution reduction not noticeable. | Resolution reduction not noticeable. | Resolution reduction slightly noticeable. | Resolution reduction is noticeable. | Resolution reduction is noticeable. |
| Graphical content | Resolution reduction not noticeable. | Resolution reduction not noticeable. | Resolution reduction not noticeable. | Resolution reduction slightly noticeable. | Resolution reduction is noticeable. |
| Pixels | 2144 × 1920 | 1920 × 1696 | 1792 × 1568 | 1664 × 1440 | 1504 × 1312 |
| Resource conservation | 0 | −10.4% | −15.9% | −20.9% | −26.0% |

In various implementations, the display controller 210 determines to generate and display different versions of the visual content 30 among the set of displays 240. In some implementations, the display controller 210 determines to generate and display different versions of the visual content 30 based on an availability of resources. For example, in some implementations, the display controller 210 determines to generate and display different versions of the visual content 30 with different resolutions in response to a battery level of the device being lower than a threshold battery level. In such implementations, generating and displaying different versions of the visual content 30 allows the device to conserve battery by generating and displaying a less resource intensive version for one of the displays 240.

In some implementations, the display controller 210 determines to generate and display different versions of the visual content 30 with different resolutions in response to a processing load of the device. For example, in some implementations, the display controller 210 determines to generate and display different versions of the visual content 30 in response to the processing load being greater than a threshold processing load. In such implementations, generating and displaying different versions of the visual content 30 allows the device to reduce the processing load of the device by generating and displaying a version for one of the displays 240 that requires less processing.

In some implementations, the display controller 210 determines to generate and display different versions of the visual content 30 with different resolutions based on a content type associated with the visual content 30. Reducing the resolution of the visual content 30 may be less noticeable to the user 22 when the visual content 30 represents a particular type of content. For example, reducing the resolution of a version of the visual content 30 that is displayed on one of the displays 240 may be less noticeable to the user 22 when the visual content 30 represents a video content and more noticeable when the visual content 30 represents textual content. In this example, the display controller 210 may determine to generate and display a reduced resolution version of the visual content 30 when the visual content 30

As can be seen in the table above, the noticeability threshold for textual content is different from the noticeability threshold for graphical content. While both textual and graphical content can be presented at 32 ppd without the lower resolution being noticeable to the user or adversely impacting viewability, at 28 ppd the resolution for textual content is noticeably low but not low enough to adversely impact readability. However, at 24 ppd and 20 ppd the resolution for textual content may be unacceptably low because the lower resolution may adversely impact readability (e.g., the user may not be able to read the text at 24 ppd and 20 ppd). By contrast, for graphical content, at 24 ppd the reduced resolution may be noticeable but may not adversely impact viewability. However, at 20 ppd, the reduced resolution for graphical content can adversely impact viewability. In various implementations, the display controller 210 determines a reduction in resolution based on a combination of a current system load, a type of content, a target rendering time and a noticeability of the reduced resolution.

In various implementations, the display controller 210 obtains textures and a variable rasterization rate (VRR) map at time Tn. In some implementations, the display controller 210 retrieves the scale values stored in the LUTs 52, 54 and 56 at time Tn. The display controller 210 provides the textures and the VRR map to the renderer 220. As shown in FIG. 2, the renderer 220 utilizes the textures and the VRR map to perform a rendering operation that results in a rendering result 222. The renderer 220 provides the rendering result 222 to the compositor 230. The rendering result 222 may include the first image frame 30a that represents the visual content 30 at the first resolution and the second image frame 30b that represents the visual content 30 at the second resolution that is different from (e.g., less than) the first resolution.

As shown in FIG. 2, in various implementations, the display controller 210 obtains textures and a VRR map at time Tn+x that occurs after the time Tn. The display controller 210 provides the textures and the VRR map corresponding to the time Tn+x to the compositor 230. As shown in FIG. 2, in various implementations, the compositor 230 performs a compositing operation by obtaining the rendering result 222 from the renderer 220 and compositing the rendering result 222 with the VRR map at time Tn+x. The compositing operation performed by the compositor 230 results in a compositing result 232 that is displayed on the displays 240. In various implementations, the compositing result 232 is a spatially scaled version of the rendering result 222. For example, in some implementations, the compositor 230 generates the compositing result 232 by spatially scaling sections of the rendering result 222 based on scale values stored in the LUTs 52, 54 and 56. In some implementations, the compositing result 232 includes the first version 34 of the visual content 30 for a first one of the displays 240 (e.g., for the first display 24 shown in FIG. 1A) and the second version 36 of the visual content 30 for a second one of the displays 240 (e.g., for the second display 26 shown in FIG. 1A). In such implementations, displaying the compositing result 232 includes displaying the first version 34 of the visual content 30 on the first one of the displays 240 and displaying the second version 36 of the visual content 30 on the second one of the displays 240 (e.g., displaying the first version 34 of the visual content 30 on the first display 24 and displaying the second version 36 of the visual content 30 on the second display 26).

Figure 3:
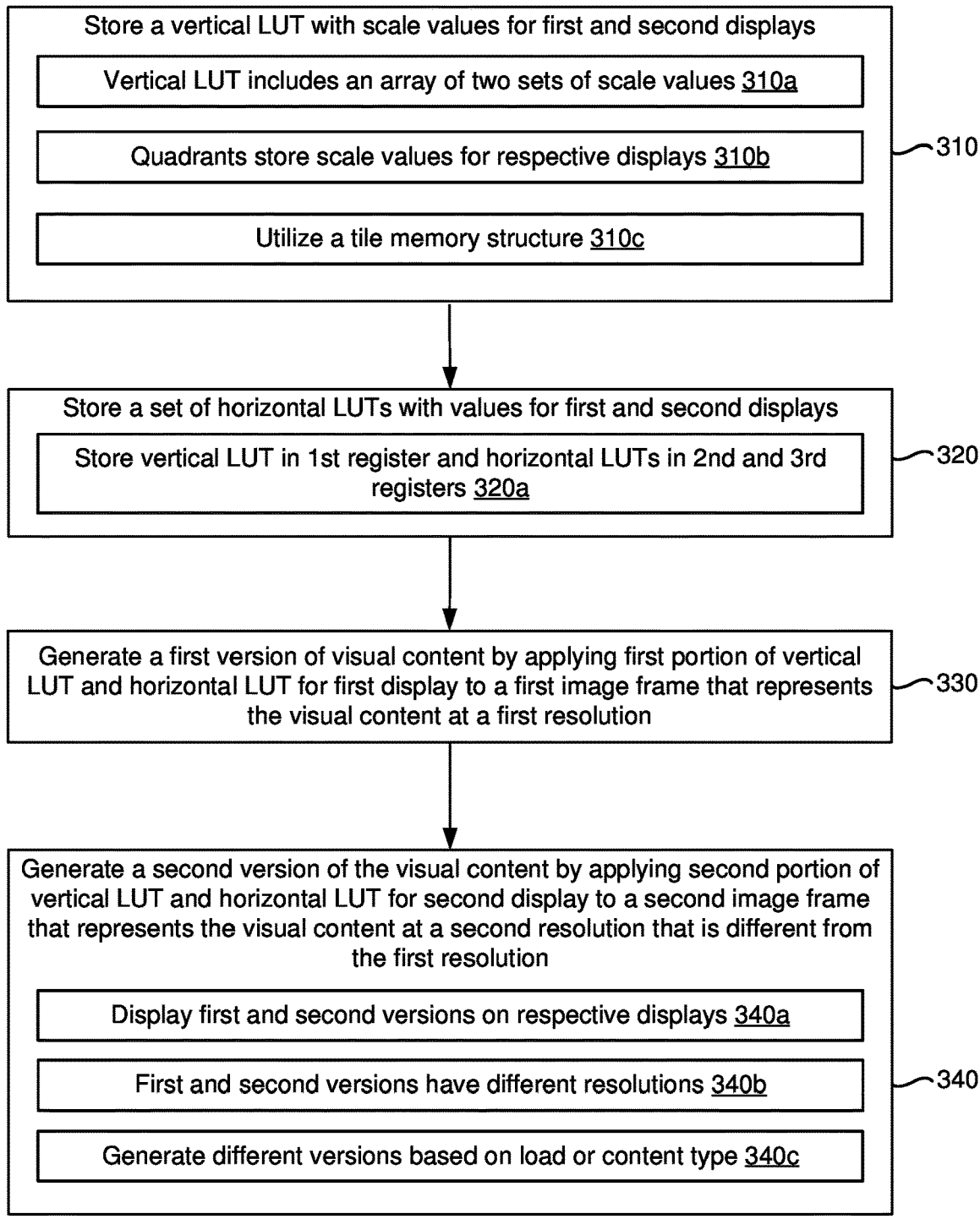
FIG. 3 is a flowchart representation of a method of generating different versions of visual content in accordance with some implementations.

FIG. 3 is a flowchart representation of a method 300 for generating different versions of visual content for respective displays. In various implementations, the method 300 is performed by a device including a first display, a second display, a non-transitory memory and one or more processors coupled with the first display, the second display and the non-transitory memory (e.g., the electronic device 20 shown in FIG. 1A and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes storing a vertical lookup table in the non-transitory memory. In some implementations, a first portion of the vertical lookup table stores first vertical scale values for the first display and a second portion of the vertical lookup table stores second vertical scale values for the second display. In some implementations, the first vertical scale values define how sections of a first input image are to be spatially scaled (e.g., spatially expanded or spatially contracted) in a vertical dimension in order to generate a first output image for the first display. Similarly, in some implementations, the second vertical scale values define how sections of a second input image are to be spatially scaled (e.g., spatially stretched or spatially compressed) in the vertical dimension in order to generate a second output image for the second display. For example, as shown in FIG. 1A, the electronic device 20 stores the vertical LUT 52 in the first register 42, and the vertical LUT 52 has a first portion 52a that stores first vertical scale values for the first display 24 and a second portion 52b that stores second vertical scale values for the second display 26.

As represented by block 310a, in some implementations, the vertical lookup table includes an array of two sets of vertical scale values with a height that is double of a height of a target texture size. For example, as shown in FIG. 1B, the vertical LUT 52 is implemented as the array 60 with a height that is double of a height of the populated portion of the first index position 62. In some implementations, the first portion of the vertical lookup table corresponds to an upper half of a first index position within the array that stores the first vertical scale values for the first display as a first one of the two sets of vertical scale values. For example, as shown in FIG. 1B, the first set of vertical scale values 64 are stored in the top half 70 of the first index position 62 within the array 60. In some implementations, the second portion of the vertical lookup table corresponds to a lower half of a second index position within the array that stores the second vertical scale values for the second display as a second one of the two sets of vertical scale values. For example, as shown in FIG. 1B, the second set of vertical scale values 68 are stored in the bottom half 72 of the second index position 66 within the array 60. In some implementations, the first version of the visual content is generated by applying the upper half of the array to a first image frame that represents the visual content at a first resolution (e.g., by spatially scaling sections of the first image frame in accordance with the scale values stored in the upper half of the array), and the second version of the visual content is generated by applying the lower half of the array to a second image frame that represents the visual content at a second resolution (e.g., by spatially scaling sections of the second image frame in accordance with the scale values stored in the lower half of the array). For example, the electronic device 20 can generate the first version 34 of the visual content 30 by applying the top half 70 of the array 60 to the first image frame 30a that represents the visual content 30 at the first resolution, and the electronic device 20 can generate the second version 36 of the visual content 30 by applying the bottom half 72 of the array 60 to the second image frame 30b that represents the visual content 30 at the second resolution. As described herein, in various implementations, the vertical lookup table is implemented as a double tall configuration.

In some implementations, the upper half of the first index position and a lower half of the first index position are mapped to a first physical memory location. For example, as shown in FIG. 1D, the top half 70 and the bottom half 72 of the first index position 62 of the array 60 that corresponds to (e.g., stores) the first set of vertical scale values 64 are both mapped to the first physical memory location 104 in the physical memory 102. Mapping the top half 70 and the bottom half 72 of the first index position 62 to the same physical memory location instead of different physical memory locations conserves physical memory. In some implementations, the lower half of the second index position and an upper half of the second index position are mapped to a second physical memory location. For example, as shown in FIG. 1D, the top half 70 and the bottom half 72 of the second index position 66 of the array 60 that corresponds to (e.g., stores) the second set of vertical scale values 68 are both mapped to the second physical memory location 106. Mapping the top half 70 and the bottom half 72 of the second index position 66 to the same physical memory location instead of different physical memory locations conserves physical memory. Since the top half 70 and the bottom half 72 of each index position within the array 60 are mapped to the same physical memory location, such implementations are sometimes referred to as a double mapped implementations of the double tall configuration.

In various implementations, the double tall configuration is implemented in tile. In some implementations, the array is stored in a tile memory structure. For example, as shown in FIG. 1F, the array 60 is stored in the tile memory structure 120. In some implementations, the first vertical scale values for the first display are mapped to a first physical memory location and the second vertical scale values for the second display are mapped to a second physical memory location.

For example, as shown in FIG. 1F, the first set of vertical scale values 64 for the first display 24 are mapped to the first physical memory location 104 and the second set of vertical scale values 68 for the second display 26 are mapped to the second physical memory location 106.

As represented by block 310b, in some implementations, the vertical lookup table stores a single set of scale values. For example, as shown in FIG. 1C, the vertical LUT 80 stores the single set of vertical scale values 82. In some implementations, the first portion of the vertical lookup table corresponds to a first quadrant of the vertical lookup table that stores the first vertical scale values for the first display. For example, as shown in FIG. 1C, the vertical LUT 80 stores the first vertical scale values 84 for the first display 24 in a top-left quadrant of the vertical LUT 80. In some implementations, the second portion of the vertical lookup table corresponds to a second quadrant of the vertical lookup table that stores the second vertical scale values for the second display. For example, as shown in FIG. 1C, the vertical LUT 80 stores the second vertical scale values 86 for the second display 26 in a bottom-right quadrant of the vertical LUT 80. In some implementations, the first and second quadrants are on opposite sides of a diagonal (e.g., the diagonal line 92 shown in FIG. 1C). In some implementations, the first version of the visual content is generated by applying the first vertical scale values from the first quadrant of the lookup table to a first image frame that represents the visual content at the first resolution, and the second version of the visual content is generated by applying the second vertical scale values from the second quadrant of the lookup table to a second image frame that represents the visual content at the second resolution. For example, as discussed in relation to FIG. 1C, the electronic device 20 can generate the first version 34 of the visual content 30 (shown in FIG. 1A) by applying the first vertical scale values 84 stored in the top-left quadrant of the vertical LUT 80 to the first image frame 30a. For example, the electronic device 20 spatially scales the first image frame 30a in accordance with the first vertical scale values 84 to generate the first version 34 of the visual content 30. Similarly, as discussed in relation to FIG. 1C, the electronic device 20 can generate the second version 36 of the visual content 30 (shown in FIG. 1A) by applying the second vertical scale values 86 stored in the bottom-right quadrant of the vertical LUT 80 to the second image frame 30b. For example, the electronic device 20 spatially scales the second image frame 30b in accordance with the second vertical scale values 86 to generate the second version 36 of the visual content 30. As described herein, in various implementations, the vertical LUT is implemented as a diagonal shared configuration.

In some implementations, the first quadrant and the second quadrant are across a diagonal line that extends through the vertical lookup table. For example, as shown in FIG. 1C, the top-left quadrant that stores the first vertical scale values 84 for the first display 24 and the bottom-left quadrant that stores the second vertical scale values 86 for the second display 26 are across the diagonal line 92 that extends through the vertical LUT 80. In some implementations, a third quadrant that is below or above the first quadrant stores null values. For example, the bottom-left quadrant that is below the top-left quadrant stores null values (e.g., is empty, for example, because the bottom-left quadrant does not store scale values). In some implementations, the first quadrant and the third quadrant are mapped to a first physical memory location. For example, as shown in FIG. 1E, the top-left quadrant and the bottom-left quadrant are mapped to the first physical memory location 108. In some implementations, a fourth quadrant that is below or above the second quadrant stores null values. For example, as shown in FIGS. 1C and 1E, the top-right quadrant that is above the bottom-right quadrant stores null values (e.g., is empty, for example, because the top-right quadrant does not store scale values). In some implementations, the second quadrant and the fourth quadrant are mapped to a second physical memory location. For example, as shown in FIG. 1E, the top-right quadrant and the bottom-right quadrant are mapped to the second physical memory location 110. Double mapping a populated quadrant and an unpopulated quadrant (e.g., an empty quadrant) that is adjacent to (e.g., above or below) the populated quadrant instead of mapping the populated quadrant and the unpopulated quadrant to different physical memory locations conserves physical memory. In some implementations, the vertical lookup table is stored in a tile memory structure, the first vertical scale values in the first quadrant of the vertical lookup table are mapped to a first physical memory location, and the second vertical scale values in the second quadrant of the vertical lookup table are mapped to a second physical memory location. For example, the vertical LUT 80 shown in FIGS. 1C and 1E may be stored in the tile memory structure 120 shown in FIG. 1F.

As represented by block 310c, in some implementations, storing the vertical lookup table includes storing, in a tile memory structure, the first vertical scale values as a first set of vertical scale values of a first target size for the first display and the second vertical scale values as a second set of vertical scale values of a second target size for the second display. For example, as shown in FIG. 1F, the first set of vertical scale values 64 for the first display 24 have a first size that spans an entirety of the top half 70 of the first index position 62 within the array 60, and the second set of vertical scale values 68 for the second display 26 have a second size that spans less than an entirety of the bottom half 72 of the second index position 66 within the array 60. In some implementations, the method 300 includes writing, from the tile memory structure, the first set of vertical scale values and the second set of vertical scale values into an array of two sets of vertical scale values that is stored in the non-transitory memory. For example, as shown in FIG. 1F, the first set of vertical scale values 64 from the first index position 62 are mapped to the first physical memory location 104 and the second set of vertical scale values 68 from the second index position 66 are mapped to the second physical memory location 106.

As represented by block 320, in various implementations, the method 300 includes storing, in the non-transitory memory, a set of one or more horizontal lookup tables that stores horizontal scale values for the first display and the second display. As represented by block 320a, in some implementations, the non-transitory memory includes a set of registers (e.g., the set of registers 40 shown in FIG. 1A). In some implementations, storing the vertical lookup table includes storing the vertical lookup table in a first register of the set of registers. For example, as shown in FIG. 1A, the electronic device 20 stores the vertical LUT 52 in the first register 42. In some implementations, storing the set of one or more horizontal lookup tables comprises storing the set of one or more horizontal lookup tables in a combination of a second register of the set of registers and a third register of the set of registers. For example, as shown in FIG. 1A, the electronic device 20 stores the first horizontal LUT 54 and the second horizontal LUT 56 in a combination of the second register 44 and the third register 46. In some implementations, storing the set of one or more horizontal lookup tables includes storing, in the second register, a first horizontal lookup table that stores first horizontal scale values for the first display (e.g., the first horizontal LUT 54 shown in FIG. 1A). In some implementations, the method 300 includes storing, in the third register, a second horizontal lookup table that stores second horizontal scale values for the second display (e.g., the second horizontal LUT 56 shown in FIG. 1A).

As represented by block 330, in various implementations, the method 300 includes generating, for the first display, a first version of visual content by applying the first vertical scale values stored in the first portion of the vertical lookup table and the horizontal scale values stored in the set of one or more horizontal lookup tables to a first image frame that represents the visual content at a first resolution. For example, as discussed in relation to FIG. 1A, the electronic device 20 generates the first version 34 of the visual content 30 by applying the first vertical scale values stored in the first portion 52*a* of the vertical LUT 52 and the first horizontal scale values stored in the first horizontal LUT 54 to the first image frame 30*a*.

As represented by block 340, in various implementations, the method 300 includes generating, for the second display, a second version of the visual content by applying the second vertical scale values stored in the second portion of the vertical lookup table and the horizontal scale values stored in the set of one or more horizontal lookup tables to a second image frame that represents the visual content at a second resolution that is different from the first resolution. For example, as discussed in relation to FIG. 1A, the electronic device 20 generates the second version 36 of the visual content 30 by applying the second vertical scale values stored in the second portion 52*b* of the vertical LUT 52 and the second horizontal scale values stored in the second horizontal LUT 56 to the second image frame 30*b*. In some implementations, applying the first vertical scale values to the first image frame includes scaling the first image frame in a vertical dimension by a first amount and applying the second vertical scale values to the second image frame comprises scaling the second image frame in the vertical dimension by a second amount that is different from the first amount.

As represented by block 340*a*, in various implementations, the method 300 includes displaying the first version of the visual content on the first display and displaying the second version of the visual content on the second display. For example, as shown in FIG. 1A, the electronic device 20 displays the first version 34 of the visual content 30 on the first display 24 and the electronic device 20 displays the second version 36 of the visual content 30 on the second display 26.

As represented by block 340*b*, in some implementations, the first version is at a first resolution and the second version is at a second resolution that is different from the first resolution. In some implementations, the second resolution is less than the first resolution. In some implementations, the second resolution is greater than the first resolution. For example, as discussed in relation to FIG. 1A, the first version 34 and the second version 36 may be at different resolutions. Lowering the resolution of at least one of the versions 34 and 36 conserves resources (e.g., processing resources, rendering resources and/or reduces power consumption).

As represented by block 340*c*, in some implementations, the method 300 includes determining a current resource utilization of the device. In some implementations, determining the current resource utilization includes determining a current processing load of the device. In some implementations, determining the current resource utilization includes determining a current battery level of the device. In some implementations, the method 300 includes, in response to the current resource utilization exceeding a resource utilization threshold, determining to display the first version of the visual content on the first display and the second version of the visual content on the second display. For example, in some implementations, the device determines to display a lower resolution version of the visual content at one of the displays when the current processing load is greater than a threshold processing load. As another example, in some implementations, the device determines to display a lower resolution version of the visual content at one of the displays when a current battery level is less than a threshold battery level. In some implementations, the method 300 includes, in response to the current resource utilization not exceeding the resource utilization threshold, determining to display the first version of the visual content on the first display and the second display. For example, in some implementations, the device determines to display the same resolution of the visual content on both displays when the current processing load is less than the threshold processing load. As another example, in some implementations, the device determines to display the same resolution of the visual content on both displays when the current battery level is greater than the threshold battery level.

In some implementations, the method 300 includes determining a type of content represented by the visual content. In some implementations, the method 300 includes determining whether the visual content represents textual content (e.g., a website, a book, etc.) or graphical content (e.g., a video frame of a movie or a TV show). In some implementations, the method 300 includes, in response the type of content being a first type of content, determining to display the first version of the visual content on the first display and the second version of the visual content on the second display. As an example, the device determines to display a lower resolution version of the visual content on one of the displays when the visual content represents graphical content. In some implementations, the method 300 includes determining to display a lower resolution version of the visual content on one of the displays when displaying the lower resolution version of the visual content on one of the displays would not be noticeable to the user. In some implementations, the method 300 includes, in response to the type of content being a second type of content that is different from the first type of content, determining to display the first version of the visual content on the first display and the second display. As an example, the device determines to display the visual content at the same resolution on both displays when the visual content represents textual content.

In some implementations, a difference between the first version and the second version is based on a type of content represented by the visual content. In some implementations, lowering the resolution of graphical content (e.g., a video) is less noticeable than lowering the resolution of textual content. As such, the device may lower the resolution of visual content that represents graphical content to a greater extent and the device may lower the resolution of visual content that represents textual content to a lesser extent.

Figure 4:
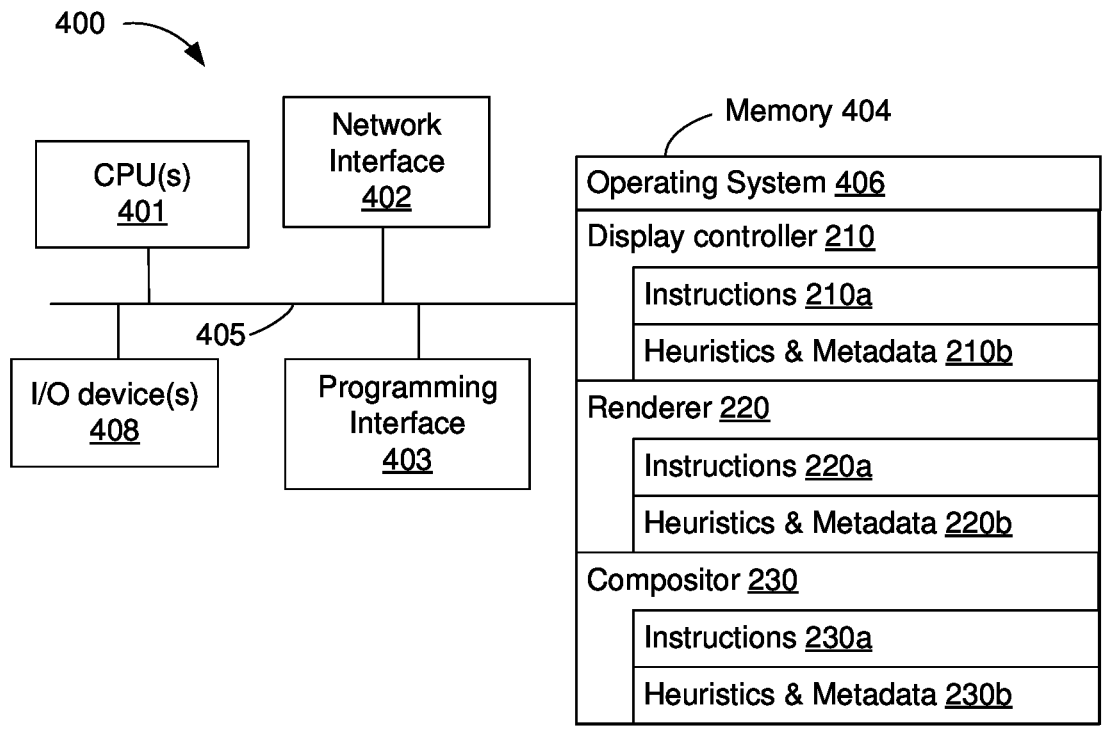
FIG. 4 is a block diagram of a device that generates different versions of visual content in accordance with some implementations.

FIG. 4 is a block diagram of a device 400 in accordance with some implementations. In some implementations, the device 400 implements the electronic device 20 shown in FIG. 1A and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the display controller 210, the renderer 220 and the compositor 230. In various implementations, the device 400 performs the method 300 shown in FIG. 3.

In some implementations, the display controller 210 includes instructions 210a, and heuristics and metadata 210b for controlling generation and display of different versions of visual content for respective displays. In some implementations, the renderer 220 includes instructions 220a, and heuristics and metadata 220b for performing a rendering operation (e.g., as illustrated and discussed in relation to FIG. 2). In some implementations, the compositor 230 includes instructions 230a, and heuristics and metadata 230b for performing a compositing operation (e.g., as illustrated and discussed in relation to FIG. 2).

In some implementations, the one or more I/O devices 408 include an input device for obtaining an input. In some implementations, the input device includes a touchscreen (e.g., for detecting tap inputs), an image sensor (e.g., for detecting gesture inputs) and/or a microphone (e.g., for detecting voice inputs). In some implementations, the one or more I/O devices 408 include an environmental sensor for capturing environmental data. In some implementations, the one or more I/O devices 408 include one or more image sensors. For example, the one or more I/O devices 408 may include a rear-facing camera of a smartphone or a tablet for capturing images (e.g., a video). As another example, the one or more I/O devices 408 may include a scene-facing camera of an HMID for capturing images (e.g., a video). In some implementations, the one or more I/O devices 408 include a set of displays (e.g., the first display 24 and the second display 26 shown in FIG. 1A).

In various implementations, the one or more I/O devices 408 include a set of video pass-through displays which displays at least a portion of a physical environment surrounding the device 400 as an image captured by a camera (e.g., the first display 24 and the second display 26 shown in FIG. 1A may be video pass-through displays). In various implementations, the one or more I/O devices 408 include a set of optical see-through displays which is at least partially transparent and passes light emitted by or reflected off the physical environment (e.g., the first display 24 and the second display 26 shown in FIG. 1A may be optical see-through displays).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
    at an electronic device including one or more processors, a non-transitory memory, a first display for a first eye and a second display for a second eye:
        storing a vertical lookup table in the non-transitory memory, wherein a first portion of the vertical lookup table stores first vertical scale values for the first display and a second portion of the vertical lookup table stores second vertical scale values for the second display;
        storing, in the non-transitory memory, a set of one or more horizontal lookup tables that stores horizontal scale values for the first display and the second display;
        generating, for the first display, a first version of visual content by applying the first vertical scale values stored in the first portion of the vertical lookup table and the horizontal scale values stored in the set of one or more horizontal lookup tables to a first image frame that represents the visual content at a first resolution; and
        generating, for the second display, a second version of the visual content by applying the second vertical scale values stored in the second portion of the vertical lookup table and the horizontal scale values stored in the set of one or more horizontal lookup tables to a second image frame that represents the visual content at a second resolution that is different from the first resolution.

2. The method of claim 1, wherein the non-transitory memory includes a set of registers;
   wherein storing the vertical lookup table comprises storing the vertical lookup table in a first register of the set of registers; and
   wherein storing the set of one or more horizontal lookup tables comprises storing the set of one or more horizontal lookup tables in a combination of a second register of the set of registers and a third register of the set of registers.

3. The method of claim 2, wherein storing the set of one or more horizontal lookup tables comprises:
   storing, in the second register, a first horizontal lookup table that stores first horizontal scale values for the first display; and
   storing, in the third register, a second horizontal lookup table that stores second horizontal scale values for the second display.

4. The method of claim 1, wherein the vertical lookup table comprises an array of two sets of vertical scale values with a height that is double of a height of a target texture size;
   wherein the first portion of the vertical lookup table corresponds to an upper half of a first index position within the array that stores the first vertical scale values for the first display as a first one of the two sets of vertical scale values;
   wherein the second portion of the vertical lookup table corresponds to a lower half of a second index position within the array that stores the second vertical scale values for the second display as a second one of the two sets of vertical scale values; and
   wherein the first version of the visual content is generated by applying the upper half of the array to the first image frame and the second version of the visual content is generated by applying the lower half of the array to the second image frame.

5. The method of claim 4, wherein the upper half of the first index position and a lower half of the first index position are mapped to a first physical memory location; and
   wherein the lower half of the second index position and an upper half of the second index position are mapped to a second physical memory location.

6. The method of claim 4, wherein the array is stored in a tile memory structure;
   wherein the first vertical scale values for the first display are mapped to a first physical memory location; and
   wherein the second vertical scale values for the second display are mapped to a second physical memory location.

7. The method of claim 1, wherein the vertical lookup table stores a single set of scale values that includes the first vertical scale values and the second vertical scale values;
   wherein the first portion of the vertical lookup table corresponds to a first quadrant of the vertical lookup table that stores the first vertical scale values for the first display;
   wherein the second portion of the vertical lookup table corresponds to a second quadrant of the vertical lookup table that stores the second vertical scale values for the second display;
   wherein the first version of the visual content is generated by applying the first vertical scale values from the first quadrant of the vertical lookup table to the first image frame and the second version of the visual content is generated by applying the second vertical scale values from the second quadrant of the vertical lookup table to the second image frame.

8. The method of claim 7, wherein the first quadrant and the second quadrant are across a diagonal line that extends through the vertical lookup table;
   wherein a third quadrant that is below or above the first quadrant stores null values;
   wherein the first quadrant and the third quadrant are mapped to a first physical memory location;
   wherein a fourth quadrant that is below or above the second quadrant stores null values; and
   wherein the second quadrant and the fourth quadrant are mapped to a second physical memory location.

9. The method of claim 7, wherein the vertical lookup table is stored in a tile memory structure;
   wherein the first vertical scale values in the first quadrant of the vertical lookup table are mapped to a first physical memory location; and
   wherein the second vertical scale values in the second quadrant of the vertical lookup table are mapped to a second physical memory location.

10. The method of claim 1, wherein storing the vertical lookup table comprises:
    storing, in a tile memory structure, the first vertical scale values as a first set of vertical scale values of a first target size for the first display and the second vertical scale values as a second set of vertical scale values of a second target size for the second display; and
    writing, from the tile memory structure, the first set of vertical scale values and the second set of vertical scale values into an array of two sets of vertical scale values that is stored in the non-transitory memory.

11. The method of claim 1, further comprising:
    displaying the first version of the visual content on the first display; and
    displaying the second version of the visual content on the second display.

12. The method of claim 1, further comprising:
    determining a current resource utilization of the device;
    in response to the current resource utilization exceeding a resource utilization threshold, determining to display the first version of the visual content on the first display and the second version of the visual content on the second display; and
    in response to the current resource utilization not exceeding the resource utilization threshold, determining to display the first version of the visual content on the first display and the second display.

13. The method of claim 1, further comprising:
    determining a type of content represented by the visual content;
    in response to the type of content being a first type of content, determining to display the first version of the visual content on the first display and the second version of the visual content on the second display; and
    in response to the type of content being a second type of content that is different from the first type of content, determining to display the first version of the visual content on the first display and the second display.

14. The method of claim 1, wherein a difference between the first version and the second version is based on a type of content represented by the visual content.

15. The method of claim 1, wherein the first vertical scale values define how corresponding portions of the first image frame are scaled in a vertical dimension to generate the first version of the visual content and the second vertical scale values define how corresponding portions of the second image frame are scaled in the vertical dimension to generate the second version of the visual content.

16. The method of claim 1, wherein applying the first vertical scale values to the first image frame comprises scaling the first image frame in a vertical dimension by a first amount and applying the second vertical scale values to the second image frame comprises scaling the second image frame in the vertical dimension by a second amount that is different from the first amount.

17. An electronic device comprising:
one or more processors;
a first display for a first eye;
a second display for a second eye:
a non-transitory memory; and
one or more programs stored in the non-transitory memory, which, when executed by the one or more processors, cause the electronic device to:
store a vertical lookup table in the non-transitory memory, wherein a first portion of the vertical lookup table stores first vertical scale values for the first display and a second portion of the vertical lookup table stores second vertical scale values for the second display;
store, in the non-transitory memory, a set of one or more horizontal lookup tables that stores horizontal scale values for the first display and the second display;
generate, for the first display, a first version of visual content by applying the first vertical scale values stored in the first portion of the vertical lookup table and the horizontal scale values stored in the set of one or more horizontal lookup tables to a first image frame that represents the visual content at a first resolution; and
generate, for the second display, a second version of the visual content by applying the second vertical scale values stored in the second portion of the vertical lookup table and the horizontal scale values stored in the set of one or more horizontal lookup tables to a second image frame that represents the visual content at a second resolution that is different from the first resolution.

18. The electronic device of claim 17, wherein the non-transitory memory includes a set of registers;

wherein storing the vertical lookup table comprises storing the vertical lookup table in a first register of the set of registers; and
wherein storing the set of one or more horizontal lookup tables comprises storing the set of one or more horizontal lookup tables in a combination of a second register of the set of registers and a third register of the set of registers.

19. The electronic device of claim 18, wherein storing the set of one or more horizontal lookup tables comprises:
storing, in the second register, a first horizontal lookup table that stores first horizontal scale values for the first display; and
storing, in the third register, a second horizontal lookup table that stores second horizontal scale values for the second display.

20. A non-transitory memory storing one or more programs, which, when executed by one or more processors of a device including a first display and a second display, cause the device to:
store a vertical lookup table in the non-transitory memory, wherein a first portion of the vertical lookup table stores first vertical scale values for the first display and a second portion of the vertical lookup table stores second vertical scale values for the second display;
store, in the non-transitory memory, a set of one or more horizontal lookup tables that stores horizontal scale values for the first display and the second display;
generate, for the first display, a first version of visual content by applying the first vertical scale values stored in the first portion of the vertical lookup table and the horizontal scale values stored in the set of one or more horizontal lookup tables to a first image frame that represents the visual content at a first resolution; and
generate, for the second display, a second version of the visual content by applying the second vertical scale values stored in the second portion of the vertical lookup table and the horizontal scale values stored in the set of one or more horizontal lookup tables to a second image frame that represents the visual content at a second resolution that is different from the first resolution.

* * * * *